(12) United States Patent
Akashika et al.

(10) Patent No.: US 7,620,822 B2
(45) Date of Patent: Nov. 17, 2009

(54) INFORMATION PROCESSING SYSTEM FOR CONTROLLING INTEGRATED CIRCUIT CARDS AT A COMMAND LEVEL

(75) Inventors: Hideki Akashika, Tokyo (JP); Tadashi Suzuki, Tokyo (JP); Atsushi Miura, Kanagawa (JP); Jun Ogishima, Tokyo (JP); Yoshiaki Hirano, Kanagawa (JP)

(73) Assignee: Sony Corporation, Tokyo (JP)

( * ) Notice: Subject to any disclaimer, the term of this patent is extended or adjusted under 35 U.S.C. 154(b) by 872 days.

(21) Appl. No.: 11/017,939

(22) Filed: Dec. 22, 2004

(65) Prior Publication Data

US 2005/0182926 A1      Aug. 18, 2005

(30) Foreign Application Priority Data

Jan. 9, 2004    (JP) ............................. 2004-004756

(51) Int. Cl.
*H04L 9/00* (2006.01)

(52) U.S. Cl. ................... 713/190; 713/189; 709/217; 709/219

(58) Field of Classification Search ................ None
See application file for complete search history.

(56) References Cited

U.S. PATENT DOCUMENTS 4,862,501 A    8/1989   Kamitake et al.
6,075,860 A    6/2000   Ketcham
6,845,367 B2*  1/2005   Bendel et al. ................. 705/65
2002/0077993 A1*  6/2002  Immonen et al. .............. 705/77

FOREIGN PATENT DOCUMENTS

| WO | WO 00/59244 | 10/2000 |
| WO | WO 02/082386 A1 | 10/2002 |
| WO | WO 03/003772 A2 | 1/2003 |

* cited by examiner

*Primary Examiner*—Ponnoreay Pich
(74) *Attorney, Agent, or Firm*—Oblon, Spivak, McClelland, Maier & Neustadt, L.L.P.

(57) ABSTRACT

An IC card chip performs payment processing in response to item purchase in accordance with a command generated and encrypted by a secure application module. The IC card chip decrypts the encrypted command, and reads information corresponding to the command. The IC card chip appropriately encrypts the read information in accordance with key information managed together with the secure application module, and sends the encrypted information to the secure application module via a cellular telephone or the like. The secure application module generates a command for controlling the IC card chip of the cellular telephone in accordance with a request from a content server. The secure application module appropriately encrypts the generated command in accordance with the key information managed together with the IC card chip, and supplies the encrypted command to the IC card chip. The IC card chip operates in accordance with the supplied command.

8 Claims, 11 Drawing Sheets

INFORMATION PROCESSING SYSTEM FOR CONTROLLING INTEGRATED CIRCUIT CARDS AT A COMMAND LEVEL

BACKGROUND OF THE INVENTION

1. Field of the Invention

The present invention relates to information processing systems, and more particularly, to an information processing system capable of controlling integrated circuit (IC) cards at a command level.

2. Description of the Related Art

In recent years, credit cards containing IC chips have become widely used for payment in electronic business transactions performed on the Internet.

In this case, for example, a user can purchase an item in an actual shop or on an Internet shopping site by placing the user's credit card on a reader/writer connected to a personal computer or by accessing the Internet shopping site using a cellular telephone containing an IC chip having a credit card function (see Japanese Unexamined Patent Application Publication No. 2002-374570). Payment processing for this purchase is performed in accordance with a response by an IC card to an instruction from a server (for example, a content server) that manages payment information.

Information transferred between the content server and the IC card is private information, such as a purchase amount, balance information registered on the IC card, and the like. Thus, such information must be encrypted. Therefore, the contents of requests to the IC card and information sent from the IC card in accordance with the requests are encrypted.

However, instructions to IC cards have not been set at a command level, such as a read command or a write command. As a result, for example, providers that provide services using IC cards have not been able to increase the efficiency in communication nor the efficiency in server processing.

SUMMARY OF THE INVENTION

Accordingly, it is an object of the present invention to be able to send a request to an IC card at a command level.

According to an aspect of the present invention, a server apparatus in an information processing system, the server apparatus communicating with a client apparatus including a client device and a client tamper-resistant device, includes a server tamper-resistant device and a server device. The server tamper-resistant device includes an encryption unit for encrypting information corresponding to a request from the server device in accordance with key information managed by the server tamper-resistant device and by the client tamper-resistant device and generating a first encryption signal; and a decryption unit for decrypting a second encryption signal encrypted by the client tamper-resistant device in accordance with the key information. The server device includes a communication unit for performing communication with the client device, the communication not requiring encryption based on the key information; a requesting unit for requesting the server tamper-resistant device for encryption based on the key information when the server device performs communication with the client device, the communication requiring encryption based on the key information; and a processing unit for performing processing corresponding to a signal decrypted by the decryption unit of the server tamper-resistant device.

According to another aspect of the present invention, a client apparatus in an information processing system, the client apparatus communicating with a server apparatus including a server tamper-resistant device and a server device, includes a client device and a client tamper-resistant device. The client device includes a communication unit for performing communication with the server device, the communication not requiring encryption based on key information managed by the server tamper-resistant device and by the client tamper-resistant device. The client tamper-resistant device includes a decryption unit for decrypting a first encryption signal encrypted by the server tamper-resistant device in accordance with the key information; and an encryption unit for encrypting information corresponding to a decryption result of the first encryption signal in accordance with the key information and generating a second encryption signal.

According to another aspect of the present invention, an information processing system includes a server apparatus and a client apparatus. The server apparatus includes a server tamper-resistant device and a server device. The client apparatus includes a client device and a client tamper-resistant device. The server tamper-resistant device includes a first encryption unit for encrypting information corresponding to a request from the server device in accordance with key information managed by the server tamper-resistant device and by the client tamper-resistant device and generating a first encryption signal; and a first decryption unit for decrypting a second encryption signal encrypted by the client tamper-resistant device in accordance with the key information. The server device includes a first communication unit for performing communication with the client device, the communication not requiring encryption based on the key information; a requesting unit for requesting the server tamper-resistant device for encryption based on the key information when the server device performs communication with the client device, the communication requiring encryption based on the key information; and a processing unit for performing processing corresponding to a signal decrypted by the decryption unit of the server tamper-resistant device. The client device includes a second communication unit for performing communication with the server device, the communication not requiring encryption based on the key information. The client tamper-resistant device includes a second decryption unit for decrypting the first encryption signal encrypted by the first encryption unit of the server tamper-resistant device; and a second encryption unit for encrypting information corresponding to a decryption result of the first encryption signal in accordance with the key information and generating a second encryption signal.

According to the present invention, a server tamper-resistant device can perform encryption processing at a command level, and processing can be instructed to a client tamper-resistant device safely and flexibly.

DESCRIPTION OF THE PREFERRED EMBODIMENTS

According to an aspect of the present invention, a server apparatus in an information processing system, the server apparatus communicating with a client apparatus including a client device and a client tamper-resistant device, includes a server tamper-resistant device and a server device. The server tamper-resistant device includes an encryption unit (for example, a secure application module (SAM) 7 in FIG. 1 for performing processing in step S51 in FIG. 6) for encrypting information corresponding to a request from the server device in accordance with key information managed by the server tamper-resistant device and by the client tamper-resistant device and generating a first encryption signal; and a decryption unit (for example, the SAM 7 in FIG. 1 for performing processing in step S53 in FIG. 6) for decrypting a second encryption signal encrypted by the client tamper-resistant device in accordance with the key information. The server device includes a communication unit (for example, a hypertext transfer protocol (HTTP) server 181 in FIG. 5) for performing communication with the client device, the communication not requiring encryption based on the key information; a requesting unit (for example, an application program 183 in FIG. 5 for performing processing in step S31 in FIG. 6) for requesting the server tamper-resistant device for encryption based on the key information when the server device performs communication with the client device, the communication requiring encryption based on the key information; and a processing unit (for example, the application program 183 in FIG. 5 for performing processing in step S40 in FIG. 6) for performing processing corresponding to a signal decrypted by the decryption unit of the server tamper-resistant device.

The requesting unit of the server device can send a predetermined request to the server tamper-resistant device in accordance with a set order. The encryption unit of the server tamper-resistant device can generate one or more commands in accordance with the request from the requesting unit, and can encrypt the generated commands (for example, step S51 in FIG. 6 or step S181 in FIG. 8).

Figure 8:
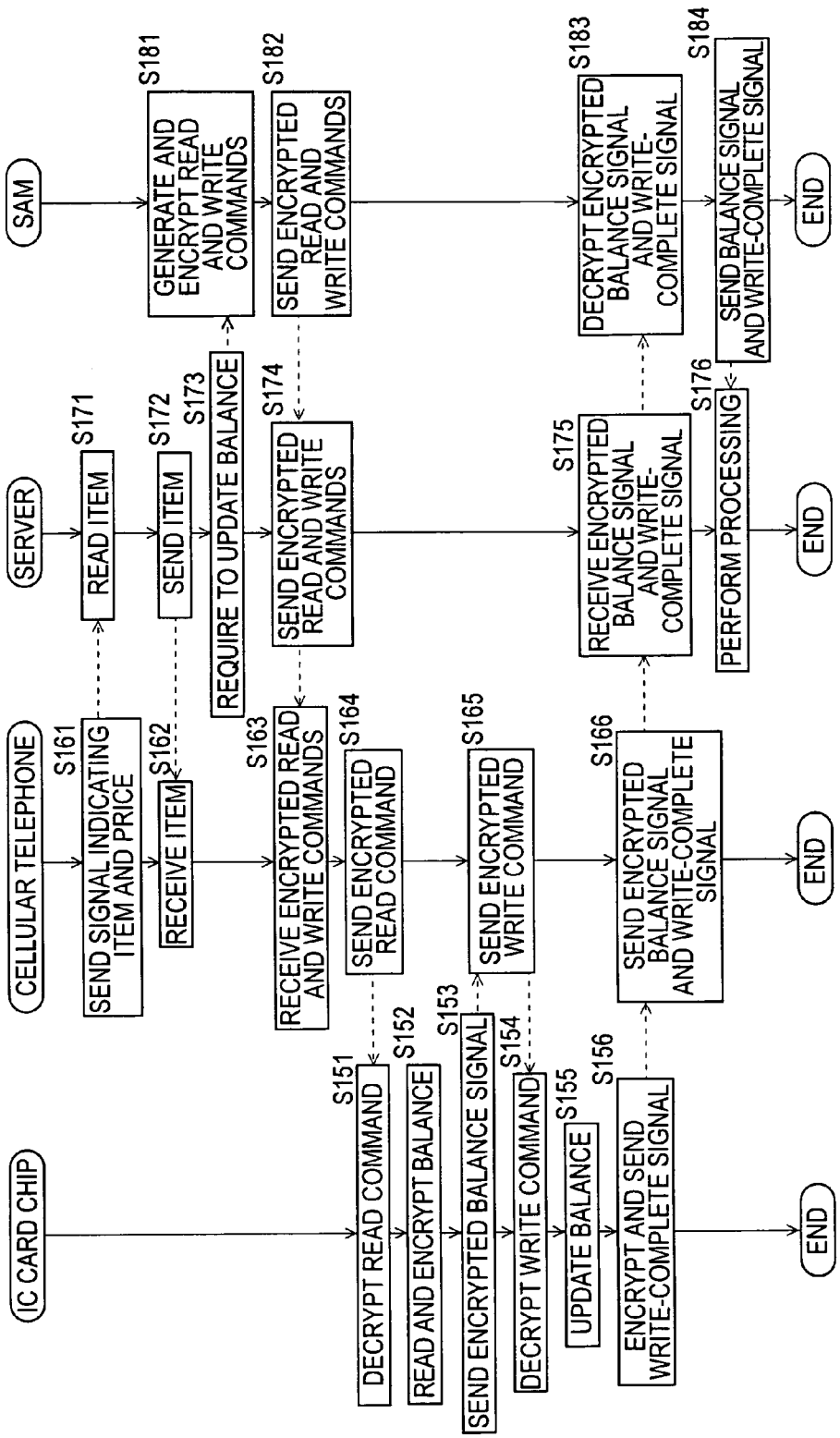
FIG. 8 is a flowchart showing another process performed by the content providing system shown in FIG. 1.

When the encryption unit of the server tamper-resistant device generates a plurality of commands in accordance with the request from the requesting unit and encrypts the plurality of commands, the encrypted plurality of commands can be provided to the client tamper-resistant device in a predetermined order (for example, steps S164 and S165 in FIG. 8).

When the encryption unit of the server tamper-resistant device generates a plurality of commands in accordance with the request from the requesting unit and encrypts the plurality of commands, the encrypted plurality of commands can be simultaneously supplied to the client device (for example, step S174 in FIG. 8).

The server tamper-resistant device and the server device can be integrated with each other.

According to another aspect of the present invention, a client apparatus in an information processing system, the client apparatus communicating with a server apparatus including a server tamper-resistant device and a server device, includes a client device and a client tamper-resistant device. The client device includes a communication unit (for example, a communication controller 91 in FIG. 3) for performing communication with the server device, the communication not requiring encryption based on key information managed by the server tamper-resistant device and by the client tamper-resistant device. The client tamper-resistant device includes a decryption unit (for example, a contactless integrated circuit (IC) card controller 111 in FIG. 3 for performing processing in step S11 in FIG. 6) for decrypting a first encryption signal encrypted by the server tamper-resistant device in accordance with the key information; and an encryption unit (for example, the contactless IC card controller 111 in FIG. 3 for performing processing in step S12 in FIG. 6) for encrypting information corresponding to a decryption result of the first encryption signal in accordance with the key information and generating a second encryption signal.

The communication unit of the client device can be a browser.

The client tamper-resistant device and the client device can be integrated with each other.

The client tamper-resistant device, the client device, and the browser can be integrated with each other.

According to another aspect of the present invention, an information processing system includes a server apparatus and a client apparatus. The server apparatus includes a server tamper-resistant device and a server device. The client apparatus includes a client device and a client tamper-resistant device. The server tamper-resistant device includes a first encryption unit (for example, the SAM 7 in FIG. 1 for performing the processing in step S51 in FIG. 6) for encrypting information corresponding to a request from the server device in accordance with key information managed by the server tamper-resistant device and by the client tamper-resistant device and generating a first encryption signal; and a first decryption unit (for example, the SAM 7 in FIG. 1 for performing the processing in step S53 in FIG. 6) for decrypting a second encryption signal encrypted by the client tamper-resistant device in accordance with the key information. The server device includes a first communication unit (for example, the HTTP server 181 in FIG. 5) for performing communication with the client device, the communication not requiring encryption based on the key information; a requesting unit (for example, the application program 183 in FIG. 5 for performing the processing in step S31 in FIG. 6) for requesting the server tamper-resistant device for encryption based on the key information when the server device performs communication with the client device, the communication requiring encryption based on the key information; and a processing unit (for example, the application program 183 in FIG. 5 for performing the processing in step S40 in FIG. 6) for performing processing corresponding to a signal decrypted by the decryption unit of the server tamper-resistant device. The client device includes a second communication unit (for example, the communication controller 91 in FIG. 3) for performing communication with the server device, the communication not requiring encryption based on the key information. The client tamper-resistant device includes a second decryption unit (for example, the contactless IC card controller 111 in FIG. 3 for performing the processing in step S11 in FIG. 6) for decrypting the first encryption signal encrypted by the first encryption unit of the server tamper-resistant device;

and a second encryption unit (for example, the contactless IC card controller 111 in FIG. 3 for performing the processing in step S12 in FIG. 6) for encrypting information corresponding to a decryption result of the first encryption signal in accordance with the key information and generating a second encryption signal.

Figure 1:
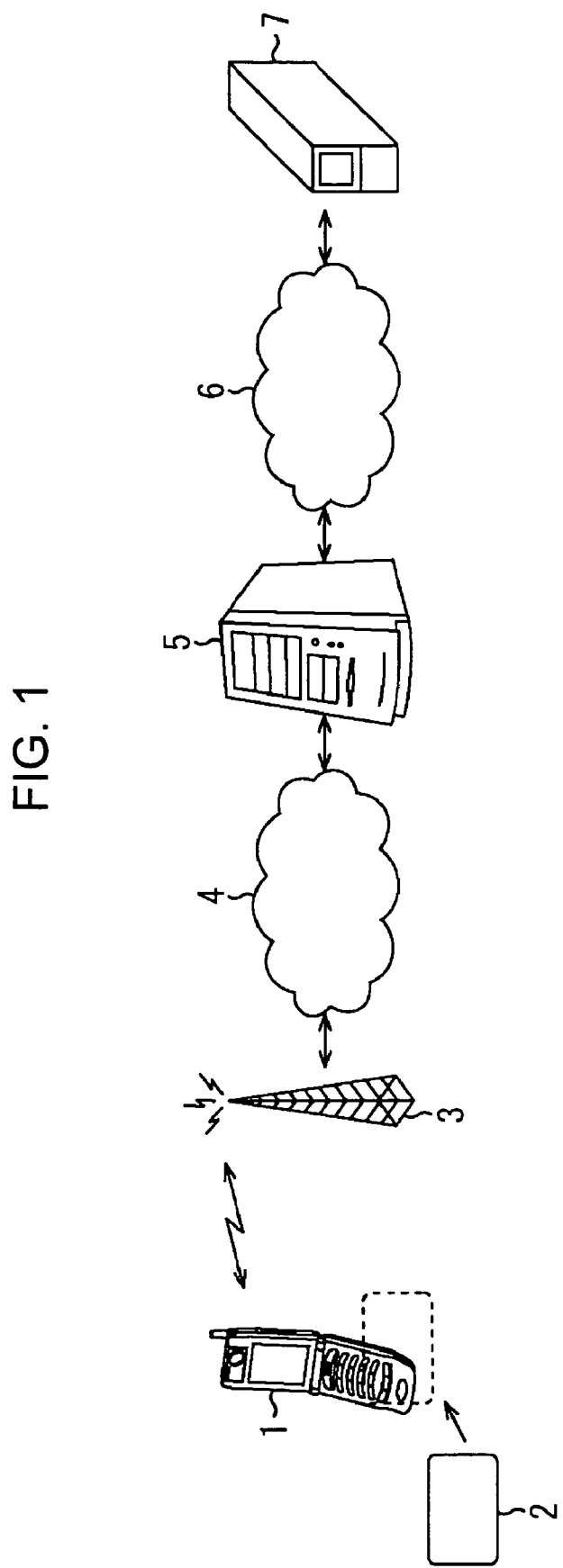
FIG. 1 shows an example of the structure of a content providing system according to the present invention.

FIG. 1 shows an example of the structure of a content providing system according to the present invention.

A cellular telephone 1 functions as a client device of the content providing system. The cellular telephone 1 includes a contactless IC card reader/writer chip 2 (hereinafter, referred to as an IC card chip 2) that implements both a function as a contactless IC card for an external reader/writer and a function as a reader/writer for an external contactless IC card.

In other words, the cellular telephone 1 (more specifically, the IC card chip 2) provides information, such as a credit card number and an expiration date, stored in a memory of the IC card chip 2 to a reader/writer by using the function of a contactless IC card. Also, the cellular telephone 1 (more specifically, the IC card chip 2) performs contactless communication with an external contactless IC card to read various types of information stored in a memory of the external contactless IC card and to write information to the external contactless IC card.

In other words, a user uses the cellular telephone 1 as a so-called "child card" of the user's credit card. Thus, the user can make a payment for a purchased item or a contract service by using the cellular telephone 1.

The cellular telephone 1 is capable of communicating with other telephones via a base station 3 and is capable of directly accessing a content server 5 via the base station 3 and a network (for example, the Internet) 4. Thus, the user can purchase items and the like from the content server 5 (or a shopping site) by sending an ID and money information set in the IC card chip 2 to the content server 5.

For example, the IC card chip 2 performs payment processing in response to item purchase in accordance with a command generated and encrypted by a secure application module (SAM) 7. The IC card chip 2 decrypts an encrypted command, and reads information (for example, card information including a card number, an expiration date, a user's name, and a balance) corresponding to the command. The IC card chip 2 appropriately encrypts the read information in accordance with key information managed together with the SAM 7, and supplies the encrypted information to the SAM 7 via the cellular telephone 1.

The IC card chip 2 performs short-distance communication with an external reader/writer via an antenna included in the IC card chip 2.

In other words, the IC card chip 2 functions as a tamper-resistant device for the client device (the cellular telephone 1) in this system. Although information encrypted by the IC card chip 2 is supplied to the SAM 7 via the cellular telephone 1 to a network 6, the encrypted information may be supplied to the SAM 7 via some parts of the cellular telephone 1 to the network 6 or supplied directly to the SAM 7.

The content server 5 uses an ID of the IC card chip 2 and the user's card information, which are registered in advance in association with each other, to send, for example, card information, money information, and the like corresponding to the ID sent from the cellular telephone 1 to a card company (not shown), so that billing processing is performed.

The SAM 7 is connected to the content server 5 via the network 6. The SAM 7 generates an authentication command for controlling the IC card chip 2, a read command for reading information stored in a memory of the IC card chip 2, and a write command for writing information into the memory, in accordance with requests from the content server 5. The SAM 7 appropriately encrypts the generated commands in accordance with key information managed together with the IC card chip 2, and supplies the encrypted commands to the IC card chip 2 via the content server 5.

In other words, the SAM 7 functions as a tamper-resistant device for the server device (the content server 5). Although information encrypted by the SAM 7 is supplied to the IC card chip 2 via the cellular telephone 1 to the network 6, the encrypted information may be supplied to the IC card chip 2 via some parts of the cellular telephone 1 to the network 6 or supplied directly to the IC card chip 2.

Figure 2:
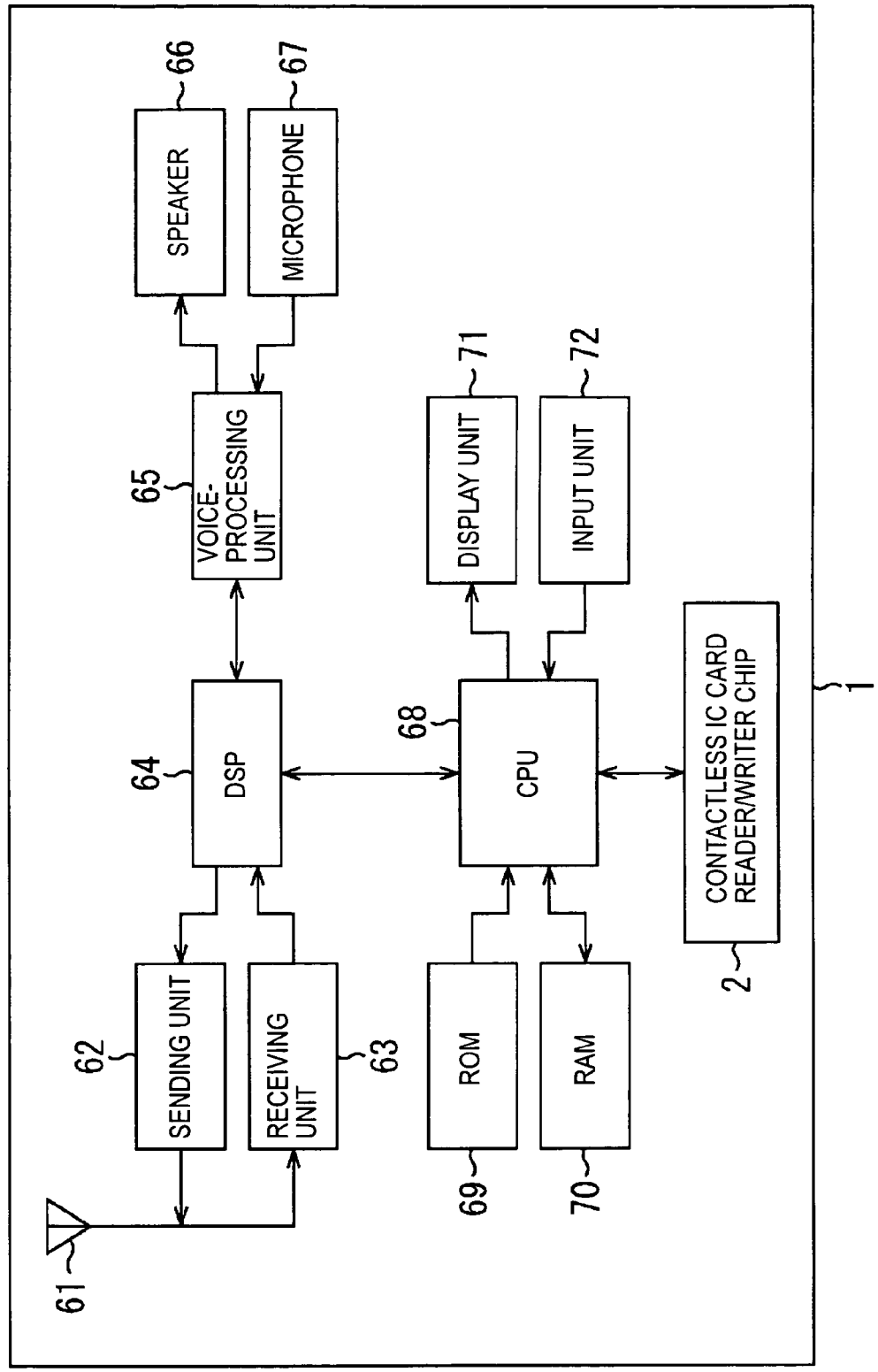
FIG. 2 is a block diagram showing an example of the structure of a cellular telephone shown in FIG. 1.

FIG. 2 is a block diagram showing an example of the structure of the cellular telephone 1 shown in FIG. 1.

A central processing unit (CPU) 68 loads a control program stored in a read-only memory (ROM) 69 into a random-access memory (RAM) 70, and controls the entire operation of the cellular telephone 1 in accordance with the control program.

For example, the CPU 68 controls a digital signal processor (DSP) 64 in accordance with a user instruction, and transfers various types of information, such as voice information, to and from the base station 3. Also, the CPU 68 controls the IC card chip 2 to perform, for example, short-distance radio communication with an adjacent reader/writer (not shown) by using electromagnetic induction.

When receiving voice information supplied from the DSP 64, a sending unit 62 performs predetermined processing, such as digital-to-analog conversion and frequency conversion, and sends an obtained voice signal from an antenna 61 using a radio channel having a predetermined sending carrier frequency selected by the base station 3.

For example, in a voice conversation mode, a receiving unit 63 amplifies an RF signal received at the antenna 61 to perform predetermined processing, such as frequency conversion and analog-to-digital conversion, and outputs obtained voice information to the DSP 64.

The DSP 64 performs, for example, spectrum de-spreading on voice information supplied from the receiving unit 63, and outputs the obtained data to a voice-processing unit 65. Also, the DSP 64 performs spectrum spreading on voice information supplied from the voice-processing unit 65, and outputs the obtained data to the sending unit 62.

The voice-processing unit 65 converts the user's voices collected at a microphone 67 into voice information, and outputs the voice information to the DSP 64. Also, the voice-processing unit 65 converts voice information supplied from the DSP 64 into an analog voice signal, and outputs a corresponding voice signal from a speaker 66.

A display unit 71 includes a liquid crystal display (LCD). In accordance with information supplied from the CPU 68, the display unit 71 displays a corresponding screen. An input unit 72 detects the user's input using buttons, such as a numeric keypad, a talk button, or a power button, arranged on a surface of the cellular telephone 1, and outputs a corresponding signal to the CPU 68.

Figure 3:
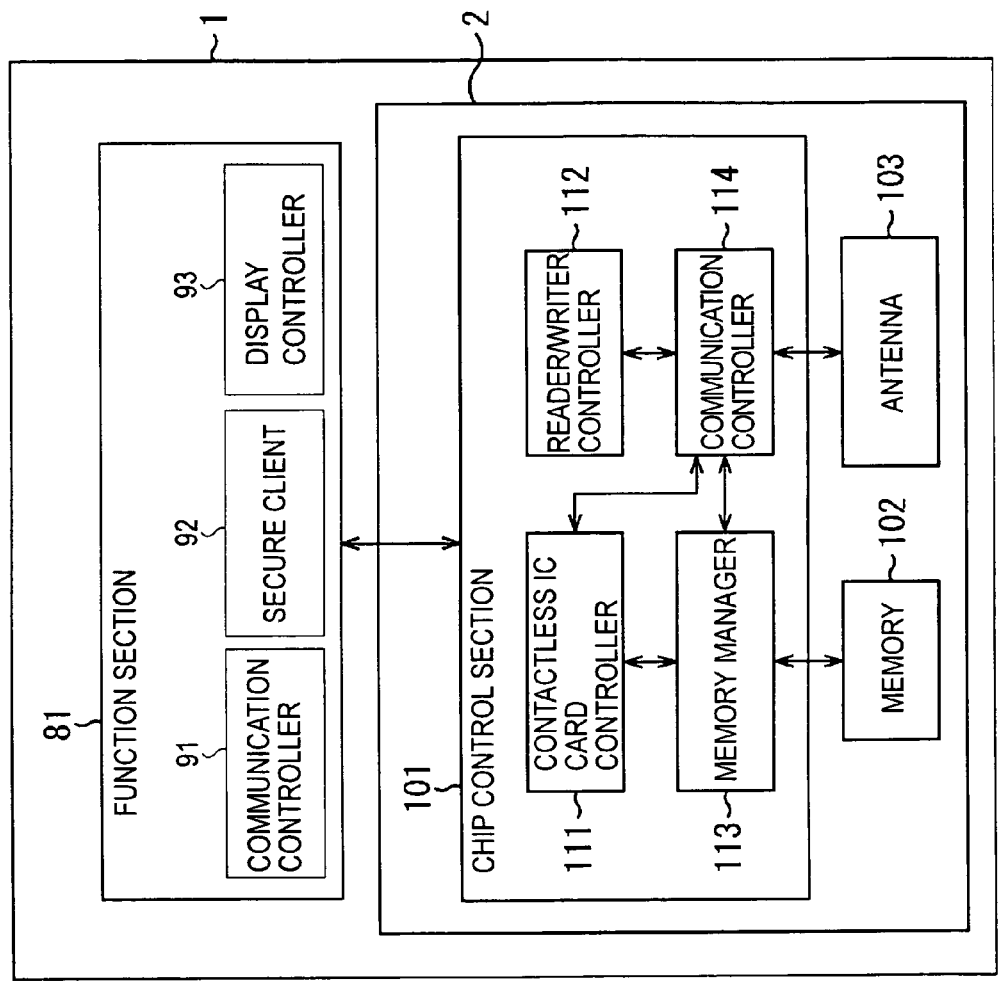
FIG. 3 is a block diagram showing an example of the functional structure of the cellular telephone shown in FIG. 1.

FIG. 3 is a block diagram showing an example of the functional structure of the cellular telephone 1 and the IC card chip 2.

A function section 81 is realized by executing a predetermined program on the CPU 68.

A communication controller 91 controls the sending unit 62 and the receiving unit 63, and controls hypertext transfer protocol (HTTP) communication using the secure sockets layer (SSL) performed via the base station 3 and the network 4.

A secure client 92 is realized by executing a mobile credit application provided by a card information management company (or downloaded from a server managed by a card information management company). The secure client 92 controls communication with a secure server 182 (in FIG. 5) of the content server 5 in accordance with a predetermined protocol based on HTTP communication performed by the communication controller 91. More specifically, the secure client 92 receives an encrypted command sent from the SAM 7, supplies the encrypted command to the IC card chip 2, and sends information encrypted by the IC card chip 2 to the SAM 7 via the content server 5.

A display controller 93 is realized by performing a predetermined display program. The display controller 93 controls the display of the display unit 71. For example, the display controller 93 displays a usage history of the card information.

A chip control section 101 is realized by executing a predetermined program on a CPU (not shown) of the IC card chip 2.

A contactless IC card controller 111 implements a contactless IC card function. For example, the contactless IC card controller 111 interprets requests, received via a communication controller 114, from an external reader/writer or commands from the SAM 7, and controls a memory manager 113 and the communication controller 114.

A reader/writer controller 112 implements a contactless IC card reader/writer function, and manages data stored in an external contactless IC card by controlling the communication controller 114.

The memory manager 113 reads information stored in a memory 102 to supply the information to the contactless IC card controller 111, and controls writing of the information to a predetermined area of the memory 102.

The communication controller 114 controls a load of the antenna 103 in accordance with an instruction from the contactless IC card controller 111 or the reader/writer controller 112, and controls short-distance communication with an external reader/writer.

Figure 4:
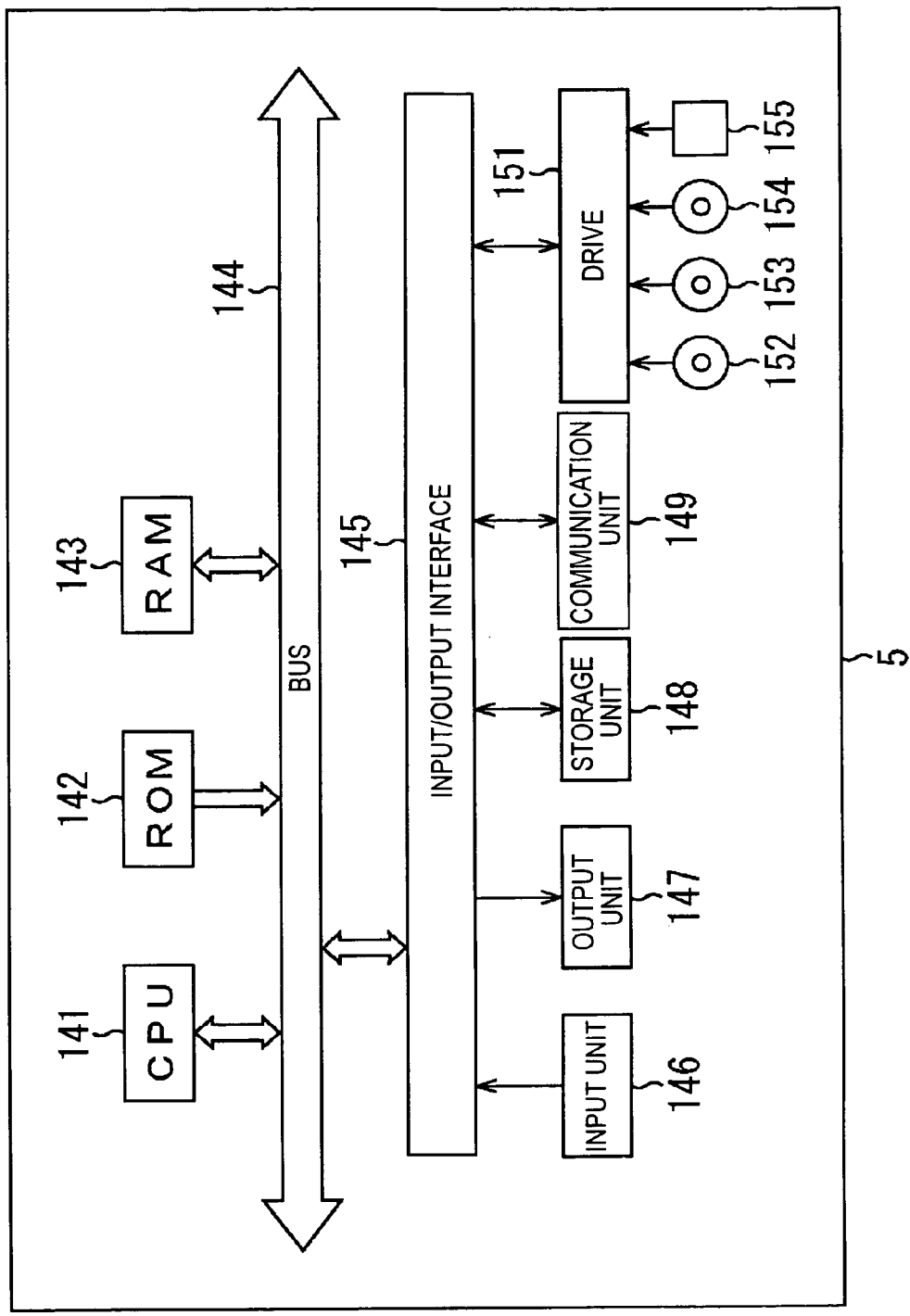
FIG. 4 is a block diagram showing an example of the structure of a content server shown in FIG. 1.

FIG. 4 is a block diagram showing an example of the structure of the content server 5 shown in FIG. 1.

A CPU 141 performs various types of processing in accordance with a program stored in a ROM 142 or a program loaded from a storage unit 148 into a RAM 143. The RAM 143 also appropriately stores data and the like necessary for performing various types of processing by the CPU 141.

The CPU 141, the ROM 142, and the RAM 143 are connected to each other via a bus 144. The bus 144 is also connected to an input/output interface 145.

The input/output interface 145 is connected to an input unit 146 including a numeric keypad, used when money information is input, and a bar code reader; an output unit including a display, such as an LCD; a storage unit 148 including a hard disk; and a communication unit 149 performing communication via the networks 4 and 6.

A drive 151 is connected to the input/output interface 145 as necessary, so that a magnetic disk 152, an optical disk 153, a magnetic optical disk 154, or a semiconductor memory 155 is appropriately installed. A computer program read via the drive 151 is installed in the storage unit 148 as necessary.

Figure 5:
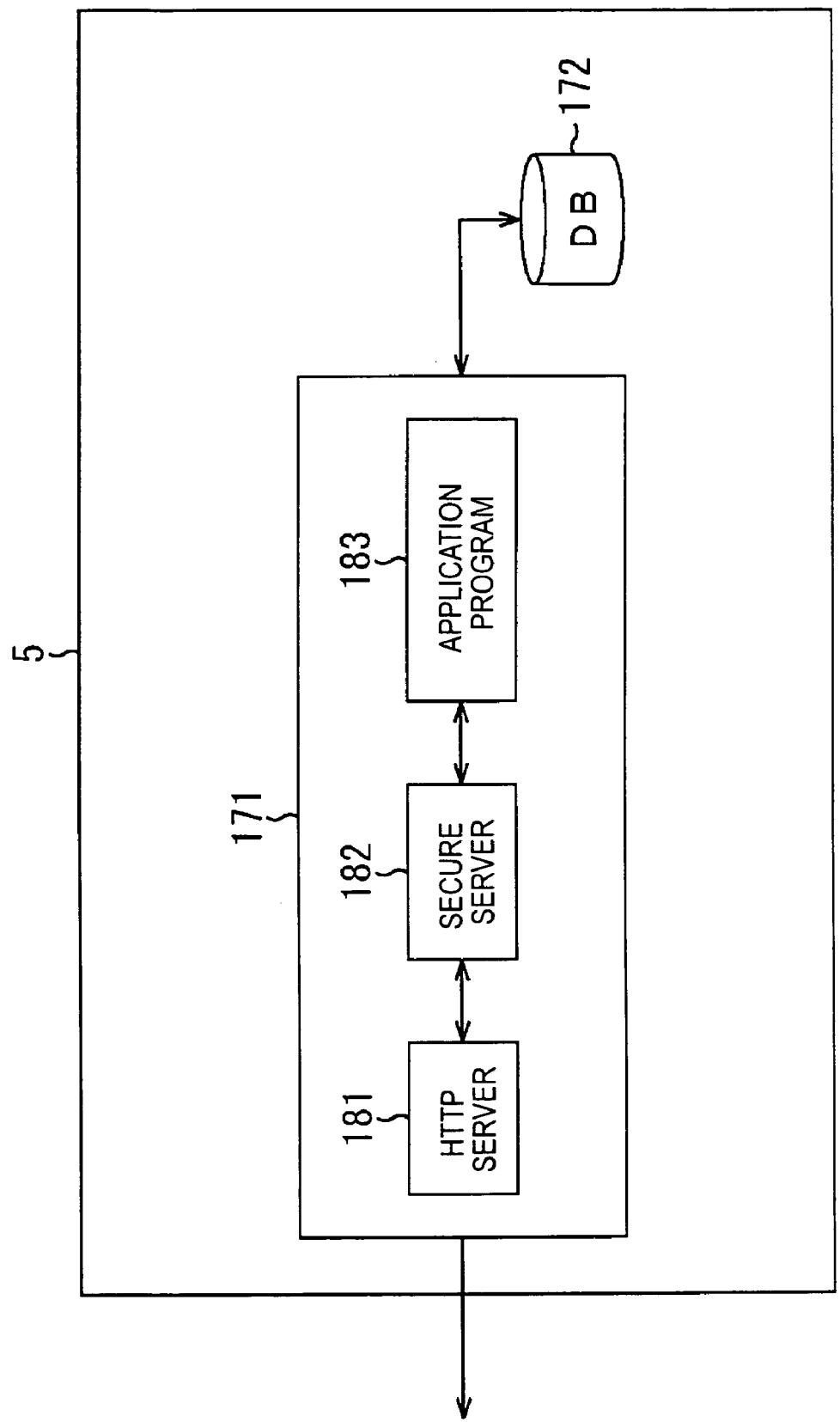
FIG. 5 is a block diagram showing an example of the functional structure of the content server shown in FIG. 1.

FIG. 5 shows an example of the functional structure of the part of the content server 5 relating to the present invention.

A communication controller 171 is realized by executing a predetermined program on the CPU 141. An HTTP server 181 establishes HTTP communication, using SSL, with the cellular telephone 1 to transfer various types of information. For example, the HTTP server 181 refers to information stored in a database 172, and performs user authentication in accordance with a password and an ID sent from the cellular telephone 1.

A secure server 182 performs communication with the secure client 92 realized in the cellular telephone 1 in accordance with a predetermined protocol based on HTTP communication. After the secure server 182 establishes communication, the SAM 7 can read and write information from and to the IC card chip 2.

An application program 183 is a program built by an administrator of the content server 5, and requires the SAM 7 to generate a command.

Information on a credit service that is subscribed to by the user and that is reported from a server or the like of a card company is stored in the database 172. For example, information, such as a card number and an expiration date, of a credit card issued by a credit service subscribed to by the user of the cellular telephone 1 is registered in the database 172 so as to be associated with a password and an ID.

A process performed by the content providing system shown in FIG. 1 having the above-mentioned structure will now be described with reference to a flowchart shown in FIG. 6.

In step S21, the communication controller 91 of the cellular telephone 1 sends a signal indicating an item (an item to be purchased) designated by a user operation on a screen of a shopping site displayed on the display unit and the price of the item to the content server 5 via the base station 3 and the network 4 in accordance with HTTP communication using SSL. Here, although processing in step S21 is the first processing in order to simplify the explanation, processing for displaying the screen of the shopping site on the display unit 71 of the cellular telephone 1 and processing for urging a user to designate a desired item are actually performed in the previous stage between the cellular telephone 1 and the content server 5.

After receiving the signal indicating the item and price sent from the cellular telephone 1, the application program 183 of the content server 5 requires the SAM 7 to read a balance of the IC card chip 2 in step S31.

After receiving the request to read the balance of the IC card chip 2 from the content server 5, the SAM 7 generates and encrypts a read command in step S51. Then, in step S52, the SAM 7 sends the encrypted read command to the content server 5 via the network 6.

In step S32, the secure server 182 of the content server 5 sends the encrypted read command received from the SAM 7 to the cellular telephone 1. In step S22, the secure client 92 of the cellular telephone 1 supplies the encrypted read command to the IC card chip 2.

In step S11, the contactless IC card controller 111 of the IC card chip 2 decrypts the encrypted read command supplied from the cellular telephone 1. As a result of decryption, in step S12, the contactless IC card controller 111 controls the memory manager 113 to read the balance from the memory 102, and encrypts the balance. In step S13, the contactless IC card controller 111 supplies a signal indicating the encrypted balance to the cellular telephone 1.

In step S23, the secure client 92 of the cellular telephone 1 sends the signal indicating the encrypted balance received from the IC card chip 2 to the content server 5. In step S33, the secure server 182 of the content server 5 sends the signal indicating the encrypted balance to the SAM 7.

After receiving the signal indicating the encrypted balance sent from the content server 5, the SAM 7 decrypts the signal indicating the encrypted balance in step S53. Then, in step S54, the SAM 7 sends a signal indicating the decrypted balance to the content server 5.

After receiving the signal indicating the balance sent from the SAM 7, the secure server 182 of the content server 5 compares the balance indicated by the signal and the price of the item to be purchased, and determines whether or not the balance is larger than or equal to the price (that is, whether the balance is sufficient to purchase the item) in step S34. Here, it is assumed that a sufficient balance is left. Then, in step S35, the secure server 182 of the content server 5 requires the cellular telephone 1 to confirm the purchase.

After receiving the request to confirm the purchase from the content server 5, the display controller 93 of the cellular telephone 1 urges the user to confirm purchase of the item by, for example, displaying the request on the display unit 71 in step S24. Here, it is assumed that a predetermined operation is performed on the display and the purchase is confirmed. In step S25, the communication controller 91 sends a signal indicating that the purchase is confirmed (purchase confirmed signal) to the content server 5.

After receiving the purchase confirmed signal sent from the cellular telephone 1, the secure server 182 of the content server 5 subtracts the price (amount of payment) from the balance in step S36. Then, in step S37, the application program 183 requires the SAM 7 to write a subtracted balance (update the balance).

After receiving the write request from the content server 5, the SAM 7 generates and encrypts a write command in step S55. Then, in step S56, the SAM 7 sends the encrypted write command to the content server 5.

In step S38, the secure server 182 of the content server 5 sends the encrypted write command sent from the SAM 7 to the cellular telephone 1. In step S26, the secure client 92 of the cellular telephone 1 supplies the encrypted write command to the IC card chip 2.

After receiving the encrypted write command from the cellular telephone 1, the contactless IC card controller 111 of the IC card chip 2 decrypts the encrypted write command in step S14. Then, in step S15, as a decryption result, the contactless IC card controller 111 of the IC card chip 2 controls the memory manager 113 to change the balance stored in the memory 102 (overwrites with a new balance).

Then, in step S16, the contactless IC card controller 111 of the IC card chip 2 sends an encrypted signal indicating that the writing is completed (a write-complete signal) to the cellular telephone 1. The encrypted write-complete signal sent from the IC card chip 2 to the cellular telephone 1 is sent to the SAM 7 via the cellular telephone 1 (step S27) and the content server 5 (step S39).

In step S57, the SAM 7 decrypts the encrypted write-complete signal sent from the content server 5. In step S58, the SAM 7 sends the write-complete signal to the content server 5.

Accordingly, in step S40, the content server 5 performs predetermined processing, such as reporting that a payment is completed to the cellular telephone 1.

As described above, the application program 183 of the content server 5 requires generation of commands one by one, and the SAM 7 generates and encrypts a command in accordance with the request. Thus, the application program 183 of the content server 5 can control the IC card chip 2 at a command level. In other words, an administrator of the content server 5 is able to set a desired command to be sent to the IC card chip 2 in a predetermined order using the application program 183. Thus, a service can be freely configured.

Although an example in which the SAM 7 generates a command every time the content server 5 (more specifically, the application program 183) requires generation of a command has been explained, the SAM 7 may generate a plurality of commands in response to a request from the content server 5.

A process performed by the content providing system when the SAM 7 generates a plurality of commands in response to a request from the content server 5 will now be described with reference to a flowchart shown in FIG. 7.

Figure 6:
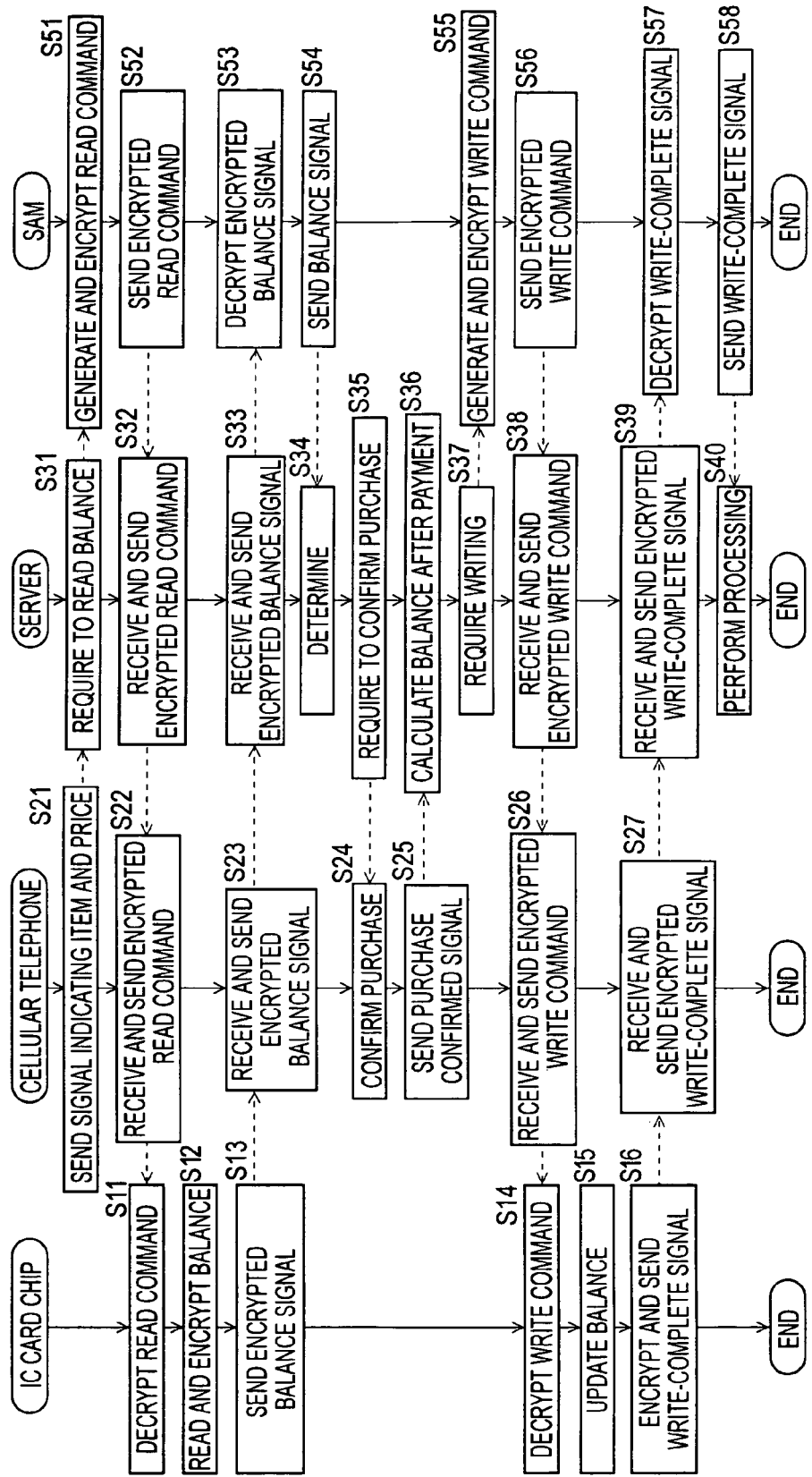
FIG. 6 is a flowchart showing a process performed by the content providing system shown in FIG. 1.

In step S71, the communication controller 91 of the cellular telephone 1 sends, for example, a signal indicating an item (an item to be purchased) designated by a user operation on a screen of a shopping site displayed on the display unit 71 and indicating the price of the item to the content server 5 via the base station 3 and the network 4, as in step S21 in FIG. 6.

After receiving the signal indicating the item and price sent from the cellular telephone 1, the secure server 182 of the content server 5 reads the item indicated by the signal from the database 172 in step S81, and sends the item to the cellular telephone 1 in step S82. In step S72, the communication controller 91 of the cellular telephone 1 receives the item sent from the content server 5.

Then, in step S83, the application program 183 of the content server 5 requires the SAM 7 to update the balance of the IC card chip 2.

After receiving the request to update the balance of the IC card chip 2 from the content server 5, the SAM 7 generates and encrypts a read command in step S101. Then, in step S102, the SAM 7 sends the encrypted read command to the content server 5 via the network 6.

In step S84, the secure server 182 of the content server 5 sends the encrypted read command sent from the SAM 7 to the cellular telephone 1. In step S73, the secure client 92 of the cellular telephone 1 supplies the encrypted read command to the IC card chip 2.

In step S61, the contactless IC card controller 111 of the IC card chip 2 decrypts the encrypted read command supplied from the cellular telephone 1. As a result of the decryption, in step S62, the contactless IC card controller 111 of the IC card chip 2 controls the memory manager 113 to read the balance from the memory 102, and encrypts the balance. In step S63, the contactless IC card controller 111 supplies a signal indicating the encrypted balance to the cellular telephone 1.

In step S74, the secure client 92 of the cellular telephone 1 sends the signal indicating the encrypted balance sent from the IC card chip 2 to the content server 5. In step S85, the secure server 182 of the content server 5 sends the signal indicating the encrypted balance to the SAM 7.

After receiving the signal indicating the encrypted balance sent from the content server 5, the SAM 7 decrypts the signal in step S103. Then, in step S104, the SAM 7 sends a signal indicating the decrypted balance to the content server 5.

After receiving the signal indicating the balance sent from the SAM 7, the secure server 182 of the content server 5 subtracts the price for purchase (payment) from the balance in step S86. Then, in step S87, the secure server 182 of the content server 5 sends a balance obtained by the subtraction to the SAM 7.

After receiving the balance from the content server 5, the SAM 7 generates and encrypts a write command in step S105. Then, in step S106, the SAM 7 sends the encrypted write command to the content server 5.

In the subsequent steps S107 to S108, steps S88 to S90, steps S75 to S76, and steps S64 to S66, processing similar to that in steps S57 to S58, steps S38 to S40, steps S26 to S27, and steps S14 to S16 in FIG. 6 is performed. Thus, explanations for these steps are omitted here.

Accordingly, in response to a request from the content server 5 (step S83), a plurality of commands (read command (step S101) and a write command (step S105)) is generated.

Although an example in which each command generated by the SAM 7 is sent to the IC card chip 2 has been described, a plurality of commands may be sent at the same time. A process performed in a case where a plurality of commands is sent simultaneously is described next with reference to a flowchart shown in FIG. 8.

Figure 7:
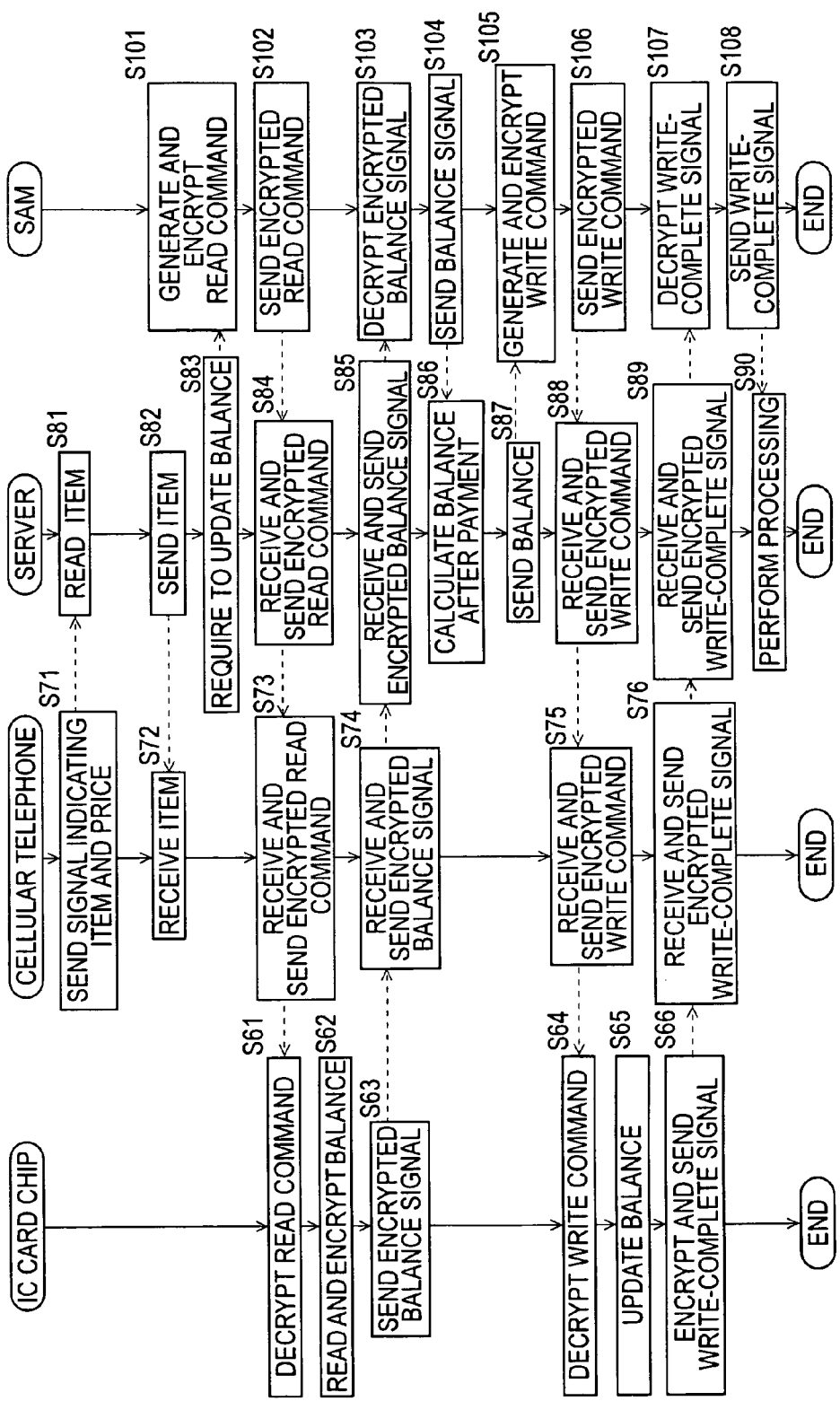
FIG. 7 is a flowchart showing another process performed by the content providing system shown in FIG. 1.

In steps S161 to S162 and steps S171 to S173, processing similar to that in steps S71 to S72 and steps S81 to S83 in FIG. 7 is performed. Thus, explanations for these steps are omitted here.

After receiving a request to update the balance of the IC card chip 2 from the content server 5, the SAM 7 generates and encrypts a read command and a write command in step S181. Then, in step S182, the SAM 7 sends the read command and the write command to the content server 5 via the network 6.

In step S174, the secure server 182 of the content server 5 sends the encrypted read and write commands sent from the SAM 7 to the cellular telephone 1. In step S163, the secure client 92 of the cellular telephone 1 receives the encrypted read and write commands.

In step S164, the secure client 92 of the cellular telephone 1 supplies the encrypted read command to the IC card chip 2.

In step S151, the contactless IC card controller 111 of the IC card chip 2 decrypts the encrypted read command supplied from the cellular telephone 1. As a result of the decryption, in step S152, the contactless IC card controller 111 of the IC card chip 2 controls the memory manager 113 to read the balance from the memory 102, and encrypts the balance. In step S153, the contactless IC card controller 111 supplies a signal indicating the encrypted balance to the cellular telephone 1.

After receiving the signal indicating the encrypted balance sent from the IC card chip 2, the secure client 92 of the cellular telephone 1 sends the encrypted write command to the IC card chip 2 in step S165.

In step S154, the contactless IC card controller 111 of the IC card chip 2 decrypts the encrypted write command supplied from the cellular telephone 1. As a result of the decryption, in step S155, the contactless IC card controller 111 of the IC card chip 2 controls the memory manager 113 to change the balance stored in the memory 102 (to overwrite with a new balance).

In the subsequent steps S156, S166, S175, S176, S183, and S184, processing similar to that in steps S66, S76, S89, S90, S107, and S108 in FIG. 7 is performed. Thus, explanations for these steps are omitted here.

Figure 9:
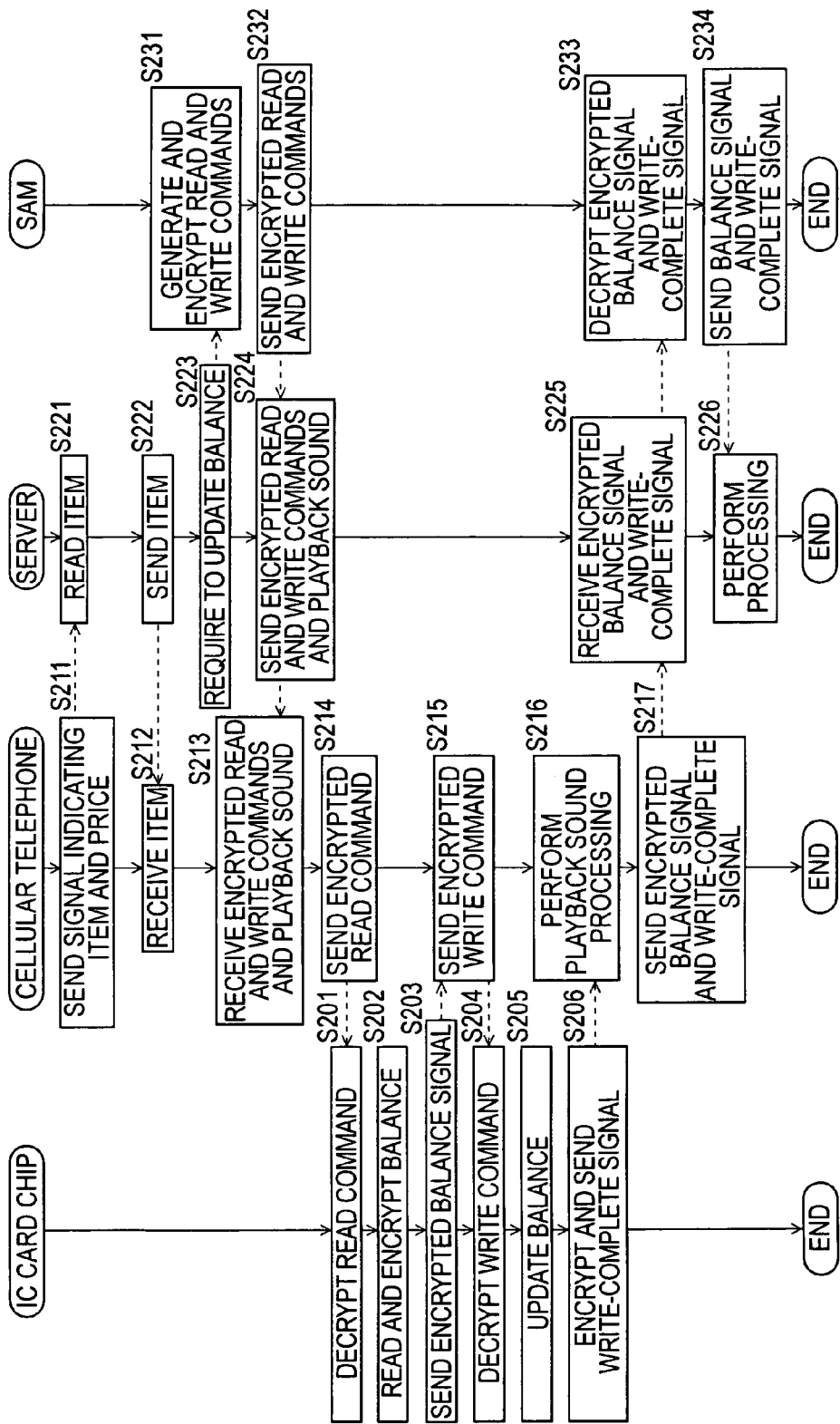
FIG. 9 is a flowchart showing another process performed by the content providing system shown in FIG. 1.

Although a case where the IC card chip 2 is controlled in accordance with an encrypted command has been described, a case where the IC card chip 2 is controlled in accordance with a non-encrypted command, together with an encrypted command, is described next with reference to FIG. 9.

In steps S211 to S212, steps S221 to S223, and steps S231 to S232, processing similar to that in steps S71 to S72, steps S81 to S83, and steps S101 to S102 in FIG. 7 is performed. Thus, explanations for these steps are omitted here.

In step S224, the secure server 182 of the content server 5 sends encrypted read and write commands sent from the SAM 7 and a command (a non-encrypted command) for generating a predetermined sound when billing is completed (hereinafter, referred to as a playback sound command) to the cellular telephone 1. In step S213, the cellular telephone 1 receives the encrypted read and write commands and the playback sound command.

In step S214, the secure client 92 of the cellular telephone 1 supplies the encrypted read command to the IC card chip 2.

In steps S201 to S206, processing similar to that in steps S61 to S66 in FIG. 7 is performed. Thus, explanations for these steps are omitted here.

After receiving an encrypted write-complete signal sent from the IC card chip 2, the CPU 68 of the cellular telephone 1 controls the DSP 64 to output a sound corresponding to the playback sound command from the speaker 66 in step S216.

In steps S217, S225, S226, S233, and S234, processing similar to that in steps S76, S89, S90, S107, and S108 in FIG. 7 is performed. Thus, explanations for these steps are omitted here.

Figure 10:
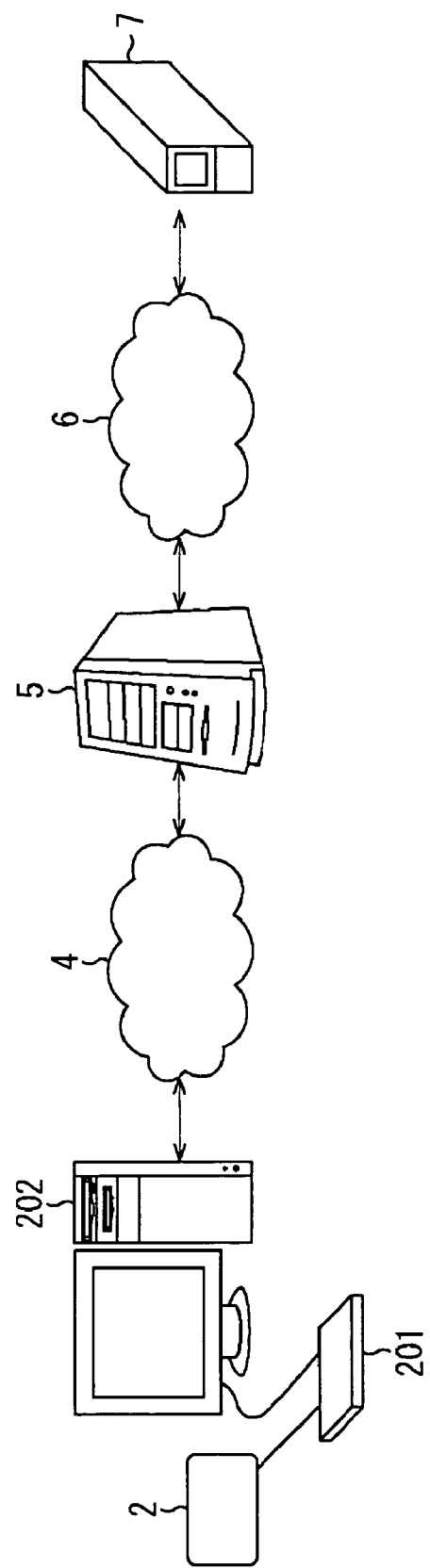
FIG. 10 shows another example of the structure of the content providing system according to the preset invention.
Figure 11:
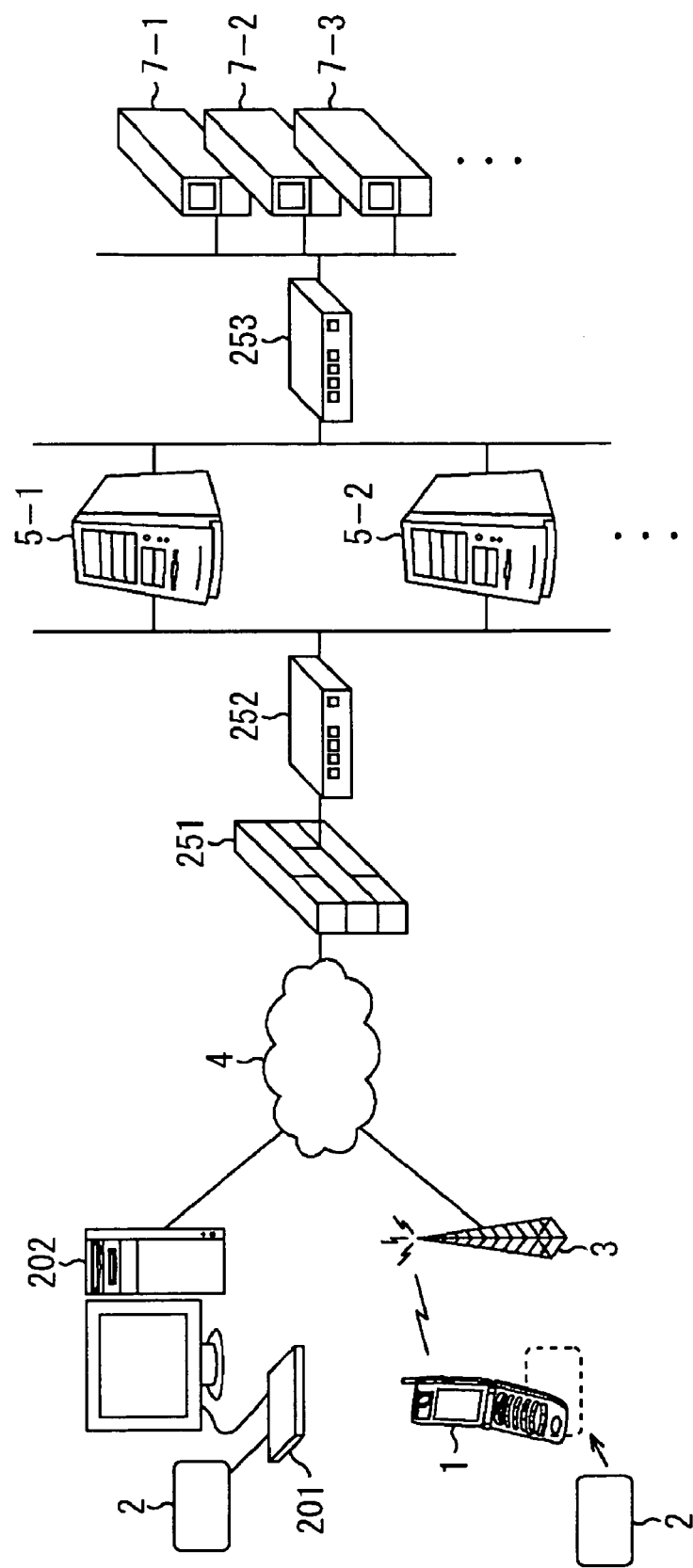
FIG. 11 shows another example of the structure of the content providing system according to the present invention.

Although an example in which the IC card chip 2 is incorporated in the cellular telephone 1 has been explained with reference to FIG. 1, a personal computer 202 connected to a reader/writer 201 may be used, as shown in FIG. 10. By enabling communication between the IC card chip 2 and the personal computer 202 by installing the IC card chip 2 in the reader/writer 201, a server side is capable of controlling the IC card chip 2 via the reader/writer 201 and the personal computer 202, as described above.

In this case, the personal computer 202 may include a browser. Communication of data other than encrypted information may be performed using the browser.

Also, in a case where many IC cards are used, a content providing system may include a plurality of content servers 5-1, 5-2, and so on; a plurality of SAMs 7-1, 7-2, and so on; a load distributor 252 distributing communication to the corresponding content servers 5-1, 5-2, and so on in accordance with a load of the corresponding content servers 5-1, 5-2, and so on; a load distributor 253 distributing communication in accordance with a load of the corresponding SAMs 7-1, 7-2, and so on; a firewall 251; and the like.

In the above description, an IC card means a contactless IC card containing an IC chip including a radio communication unit, a data transfer unit, and a data processing unit, a contact IC card having a terminal on a surface thereof, or an apparatus including an IC chip contained in an information communication terminal, such as a cellular telephone, the IC chip having a function similar to a contact or contactless IC card.

As described above, the present invention has been described with reference to particular embodiments. However, it is obvious that modifications and substitutions may be made to the present invention by those skilled in the art without departing from the spirit and scope thereof. In other words, the present invention is disclosed by way of an example and the present invention should not be understood in a limited way. In order to determine the summary of the present invention, the claims should be referred to.

This application claims priority from Japanese Patent Application No. 2004-4756 filed Jan. 9, 2004, which is hereby incorporated by reference herein.

What is claimed is:

1. A server apparatus in an information processing system, the server apparatus communicating with a client apparatus including a client device and a client tamper-resistant device, the server apparatus comprising:

a server tamper-resistant device; and a server device, wherein the server tamper-resistant device includes a processor configured to execute computer readable instructions that implements a command generation mechanism that generates one or more commands from the server device, encryption means for encrypting the commands and information corresponding to a request from the server device in accordance with key information managed by the server tamper-resistant device and by the client tamper-resistant device and generating a first encryption signal, and decryption means for decrypting a second encryption signal encrypted by the client tamper-resistant device in accordance with the key information; and the server device includes communication means for performing first communication and second communication with the client device, the first communication not requiring encryption based on the key information, requesting means for requesting the server tamper-resistant device to perform encryption based on the key information when the server performs the second communication with the client device and sending a predetermined request to the server tamper-resistant device in accordance with a set order, the second communication requiring encryption based on the key information, and processing means for performing processing corresponding to a signal decrypted by the decryption means of the server tamper-resistant device, wherein the encryption means comprises means for generating and encrypting either a read command or a write command.

2. The server apparatus according to claim 1, wherein the command generation mechanism of the server tamper-resistant device generates a plurality of commands in accordance with the request from the requesting means, the encryption means encrypts the plurality of commands, and the encrypted plurality of commands is provided to the client tamper-resistant device in a predetermined order.

3. The server apparatus according to claim 2, wherein, the encrypted plurality of commands is simultaneously supplied to the client device.

4. The server apparatus according to claim 1, wherein the server tamper-resistant device and the server device are integrated with each other.

5. An information processing system comprising:
a server apparatus; and
a client apparatus, wherein
the server apparatus includes a server tamper-resistant device and a server device;
the client apparatus includes a client device and a client tamper-resistant device;
the server tamper-resistant device includes
a processor configured to execute computer readable instructions that implements a command generation mechanism that generates one or more commands from the server device,
first encryption means for encrypting the commands and information corresponding to a request from the server device in accordance with key information managed by the server tamper-resistant device and by the client tamper-resistant device and generating a first encryption signal, and
first decryption means for decrypting a second encryption signal encrypted by the client tamper-resistant device in accordance with the key information;

the server device includes
first communication means for performing first communication with the client device, the first communication not requiring encryption based on the key information,
requesting means for requesting the server tamper-resistant device to perform encryption based on the key information when the server device performs second communication with the client device, the second communication requiring encryption based on the key information, and
processing means for performing processing corresponding to a signal decrypted by the decryption means of the server tamper-resistant device,
wherein the first encryption means comprises means for generating and encrypting either a read command or a write command;
the client device includes a third communication means for performing communication with the server device, the third communication not requiring encryption based on the key information; and
the client tamper-resistant device includes
second decryption means for decrypting the first encryption signal encrypted by the first encryption means of the server tamper-resistant device, and
second encryption means for encrypting information corresponding to a decryption result of the first encryption signal in accordance with the key information and generating a second encryption signal.

6. A server apparatus in an information processing system having the server apparatus in communication with a client apparatus that includes a client tamper-resistant device, the server apparatus comprising:
a server tamper-resistant device; and
a server device, wherein
the server tamper-resistant device includes a processor configured to execute computer readable instructions that when executed implements
a command generation mechanism configured to generate one or more commands from the server device,
an encryption mechanism configured to encrypt the commands and information corresponding to the request from the server device in accordance with key information managed by the server tamper-resistant device and by the client tamper-resistant device, and generating a first encryption signal, and
a decryption mechanism configured to decrypt a second encryption signal encrypted by the client tamper-resistant device in accordance with the key information, and the server device that includes
a processor program to implement a communication device configured to perform first communication and second communication with the client device, the first communication not requiring an encryption based on the key information,
a request mechanism configured to request that the server tamper-resistant device perform encryption based on the key information when the server device performs the second communication with the client device, and send a predetermined request to the server tamper-resistant device in accordance with a set order, the second communication requiring encryption base don the key information, and
the processor of the server device being configured to act on a signal decrypted by the decryption mechanism of the server tamper-resistant device, wherein the encryption mechanism comprises a mechanism for generating and encrypting either a read command or a write command.

7. The server apparatus according to claim 6, wherein the server tamper-resistant device generates and encrypts a plurality of commands.

8. The server apparatus according to claim 7, wherein the plurality of commands is transmitted simultaneously.

* * * * *